US012634725B2

(12) United States Patent (10) Patent No.: US 12,634,725 B2

Inomata et al. (45) Date of Patent: May 19, 2026

(54) INFORMATION PROCESSING SYSTEM, PROPAGATION ENVIRONMENT DATA PROCESSING METHOD, AND PROGRAM

(71) Applicant: NTT, Inc., Tokyo (JP)

(72) Inventors: Minoru Inomata, Tokyo (JP); Wataru Yamada, Tokyo (JP); Nobuaki Kuno, Tokyo (JP); Motoharu Sasaki, Tokyo (JP)

(73) Assignee: NTT, Inc., Tokyo (JP)

( * ) Notice: Subject to any disclaimer, the term of this patent is extended or adjusted under 35 U.S.C. 154(b) by 347 days.

(21) Appl. No.: 18/547,179

(22) PCT Filed: Apr. 5, 2021

(86) PCT No.: PCT/JP2021/014537

§ 371 (c)(1),
(2) Date: Aug. 21, 2023

(87) PCT Pub. No.: WO2022/215136

PCT Pub. Date: Oct. 13, 2022

(65) Prior Publication Data

US 2024/0172011 A1 May 23, 2024

(51) Int. Cl.
*H04W 24/06* (2009.01)
*H04W 16/18* (2009.01)
*H04W 24/10* (2009.01)

(52) U.S. Cl.
CPC ........... *H04W 24/06* (2013.01); *H04W 16/18* (2013.01); *H04W 24/10* (2013.01)

(58) Field of Classification Search
CPC ...... H04W 16/18; H04W 24/06; H04W 24/10
See application file for complete search history.

(56) References Cited

U.S. PATENT DOCUMENTS

| | | | |
|---|---|---|---|
| 2010/0232529 A1* | 9/2010 | Fettweis | H01Q 1/246 375/260 |
| 2011/0281526 A1* | 11/2011 | Matsuda | H04B 17/3913 455/67.11 |

(Continued)

FOREIGN PATENT DOCUMENTS

| | | |
|---|---|---|
| JP | 2001-168812 | 6/2001 |
| JP | 2007-329850 | 12/2007 |

(Continued)

OTHER PUBLICATIONS

"Propagation Modelling for Urban Source Localization and Navigation"; Dai; Feb. 19, 2019; University of Bath (Year: 2019).*

(Continued)

*Primary Examiner* — Benjamin H Elliott, IV

(74) *Attorney, Agent, or Firm* — IPUSA, PLLC

(57) ABSTRACT

To shorten the time required for reading the environment data to be used in a radio wave propagation simulation, an information processing system includes a division unit configured to divide a target area into a plurality of meshes of a predetermined size; an extraction unit configured to extract height information about the respective meshes of the plurality of meshes, using one or more sets of three-dimensional data indicating the position and the shape of an object present in the target area; and a creation unit configured to create mesh data including the height information about the respective meshes of the plurality of meshes.

10 Claims, 7 Drawing Sheets

(56) References Cited

U.S. PATENT DOCUMENTS

| | | | | |
|---|---|---|---|---|
| 2011/0316854 | A1* | 12/2011 | Vandrovec | G06T 17/205 |
| | | | | 345/420 |
| 2013/0115961 | A1* | 5/2013 | Shibayama | H04W 16/18 |
| | | | | 455/446 |
| 2014/0114635 | A1* | 4/2014 | Sato | H04B 17/391 |
| | | | | 703/13 |
| 2016/0162613 | A1* | 6/2016 | Shevchenko | G01V 1/3808 |
| | | | | 703/2 |
| 2017/0148211 | A1* | 5/2017 | Zakhor | G06V 10/44 |
| 2017/0200309 | A1* | 7/2017 | Qian | G06T 15/04 |
| 2017/0301104 | A1* | 10/2017 | Qian | G06F 16/583 |
| 2019/0068302 | A1* | 2/2019 | Wada | H04W 64/003 |
| 2020/0127747 | A1* | 4/2020 | Hamabe | H04B 17/23 |
| 2021/0327131 | A1* | 10/2021 | Li | G06T 19/20 |
| 2021/0405212 | A1* | 12/2021 | Fujiki | H03M 7/6047 |
| 2022/0070683 | A1 | 3/2022 | Tsuboi et al. | |
| 2022/0132270 | A1* | 4/2022 | Murata | H04W 4/026 |
| 2023/0049383 | A1* | 2/2023 | Lehtimäki | G06V 20/588 |
| 2024/0161384 | A1* | 5/2024 | Inomata | G06T 15/50 |
| 2024/0172011 | A1* | 5/2024 | Inomata | H04W 24/06 |
| 2024/0233245 | A9* | 7/2024 | Inomata | G06T 17/20 |

FOREIGN PATENT DOCUMENTS

| | | | | |
|---|---|---|---|---|
| JP | 2019-128260 | | 8/2019 | |
| JP | 2020-113826 | | 7/2020 | |
| WO | WO-2015029179 | A1 * | 3/2015 | H04W 16/22 |

OTHER PUBLICATIONS

"A GPU-Based Radio Wave Propagation Prediction With Progressive Processing on Point Cloud"; Pang et al.; IEEE Antennas and Wireless Propagation Letters, vol. 20, No. 6, Jun. 2021 (Year: 2021).*

"An Overview of Machine Learning Techniques for Radiowave Propagation Modeling"; Seretis et al.; IEEE Transactions On Antennas and Propagation, vol. 70, No. 6, Jun. 2022 (Year: 2022).*

English translation of PCT/JP2021/014537; mailed Jul. 6, 2021 (Year: 2021).*

"Field Strength Prediction of High Altitude Drop Mountain Area Based on Deep Learning"; Zhou et al.; 2022 International Conference on Engineering Education and Information Technology (EEIT) | 978-1-6654-8842-6/22/$31.00 @2022 IEEE | DOI: 10.1109/EEIT56566.2022.00030 (Year: 2022).*

"Ray Tracing for Radio Propagation Modeling: Principles and Applications"; Yun et al.; Digital Object Identifier 10.1109/ACCESS.2015.2453991; Jul. 8, 2015 (Year: 2015).*

"Efficient Ray-Tracing Algorithms for RadioWave Propagation in Urban Environments"; Hussain; Dissertation, Dublin City University, 2017 (Year: 2017).*

Homepage of Statistics Bureau of Japan (https://www.stat.go.jp/data/mesh/m_tuite.html), 1996.

* cited by examiner

| TYPE OF ZONE | DIVISION METHOD | LATITUDE INTERVAL | MERIDIAN INTERVAL | LENGTH OF ONE SIDE | RELATION WITH MAP |
|---|---|---|---|---|---|
| PRIMARY REGIONAL ZONE | ZONES FORMED BY DIVIDING WHOLE AREA OF COUNTRY ALONG LATITUDE LINES AT LATITUDES OBTAINED BY DIVIDING EVEN-NUMBER LATITUDES AND THEIR INTERVAL (120 MIN) BY 3, AND MERIDIANS AT INTERVALS OF 1 DEGREE | 40 MIN | 1 DEGREE | ABOUT 80 km | ZONE EQUIVALENT TO 1 PAGE OF 1/200000 TOPOGRAPHICAL MAP |
| SECONDARY REGIONAL ZONE (INTEGRATED REGION MESH) | ZONES FORMED BY EQUALLY DIVIDING PRIMARY REGIONAL ZONE BY 8 IN LATITUDE DIRECTION AND MERIDIAN DIRECTION | 5 MIN | 7 MIN AND 30 SEC | ABOUT 10 km | ZONE EQUIVALENT TO 1 PAGE OF 1/25000 TOPOGRAPHICAL MAP |
| REFERENCE REGION MESH (TERTIARY REGIONAL ZONE) | ZONES FORMED BY EQUALLY DIVIDING SECONDARY REGIONAL ZONE BY 10 IN LATITUDE DIRECTION AND MERIDIAN DIRECTION | 30 SEC | 45 SEC | ABOUT 1 km | |
| 1/2 REGION MESH (DIVISIONAL REGION MESH) | ZONES FORMED BY EQUALLY DIVIDING REFERENCE REGION MESH (TERTIARY REGIONAL ZONE) BY 2 IN LATITUDE DIRECTION AND MERIDIAN DIRECTION | 15 SEC | 22.5 SEC | ABOUT 500 m | |
| 1/4 REGION MESH (DIVISIONAL REGION MESH) | ZONES FORMED BY EQUALLY DIVIDING 1/2 REGION MESH BY 2 IN LATITUDE DIRECTION AND MERIDIAN DIRECTION | 7.5 SEC | 11.25 SEC | ABOUT 250 m | |

INFORMATION PROCESSING SYSTEM, PROPAGATION ENVIRONMENT DATA PROCESSING METHOD, AND PROGRAM

TECHNICAL FIELD

The present invention relates to an information processing system, a propagation environment data processing method, and a program.

BACKGROUND ART

As a method for performing a radio wave propagation simulation to be used for area evaluation and the like in a wireless communication system, there is ray tracing. In ray tracing, how radio waves (rays) transmitted from the transmission point are reflected, diffracted, or transmitted by a structural object that is present on the way to the reception point, and reach the reception point is tracked (traced) as trajectories of the respective rays, and the powers of all the rays that have reached the reception point are added up, to estimate the intensity of the radio waves at the reception point.

Also, there is a known indoor wireless communication system that uses ray tracing in simulating traveling/propagation characteristics between a wireless base station and a terminal station, and reduces electromagnetic interference on the basis of a simulation result (see Patent Literature 1, for example).

CONVENTIONAL ART LITERATURE

Patent Literature

Patent Literature 1: Japanese patent application publication No. 2001-168812

SUMMARY OF INVENTION

Problem to be Solved by Invention

For example, in a case where radio wave propagation is simulated through ray tracing or the like, it is necessary to acquire propagation environment data (hereinafter referred to as environment data) indicating the shape of a structural object, a building, or the like present in the area to be subjected to the simulation. The environment data that can be used is preferably data in various formats, such as CAD data of three-dimensional computer aided design (CAD), point cloud data acquired by light detection and ranging (LIDAR), or a building database.

However, these sets of environment data involve enormous amounts of three-dimensional data. Therefore, it takes a long time to read the environment data by the conventional technology, which hinders an increase in the speed of radio wave propagation simulations.

An embodiment of the present invention has been made in view of the above problem, and provides an information processing system that shortens the time required for reading the environment data to be used in a radio wave propagation simulation.

Means for Solving Problem

To solve the above problem, an information processing system according to an embodiment of the present invention includes: a division unit configured to divide a target area into a plurality of meshes of a predetermined size; an extraction unit configured to extract height information about the respective meshes of the plurality of meshes, using environment data indicating the position and the shape of an object present in the target area; and a creation unit configured to create mesh data indicating the height information about the respective meshes of the plurality of meshes.

Advantageous Effects of Invention

According to an embodiment of the present invention, it is possible to provide an information processing system that shortens the time required for reading the environment data to be used in a radio wave propagation simulation.

BRIEF DESCRIPTION OF DRAWINGS

FIG. 3 is a table showing a region mesh division method.

MODE FOR CARRYING OUT INVENTION

The following is a description of an embodiment (the present embodiment) of the present invention, with reference to the drawings. The embodiment described below is merely an example, and embodiments to which the present invention is applied are not limited to the embodiment described below.

<System Configuration>

Figure 1:
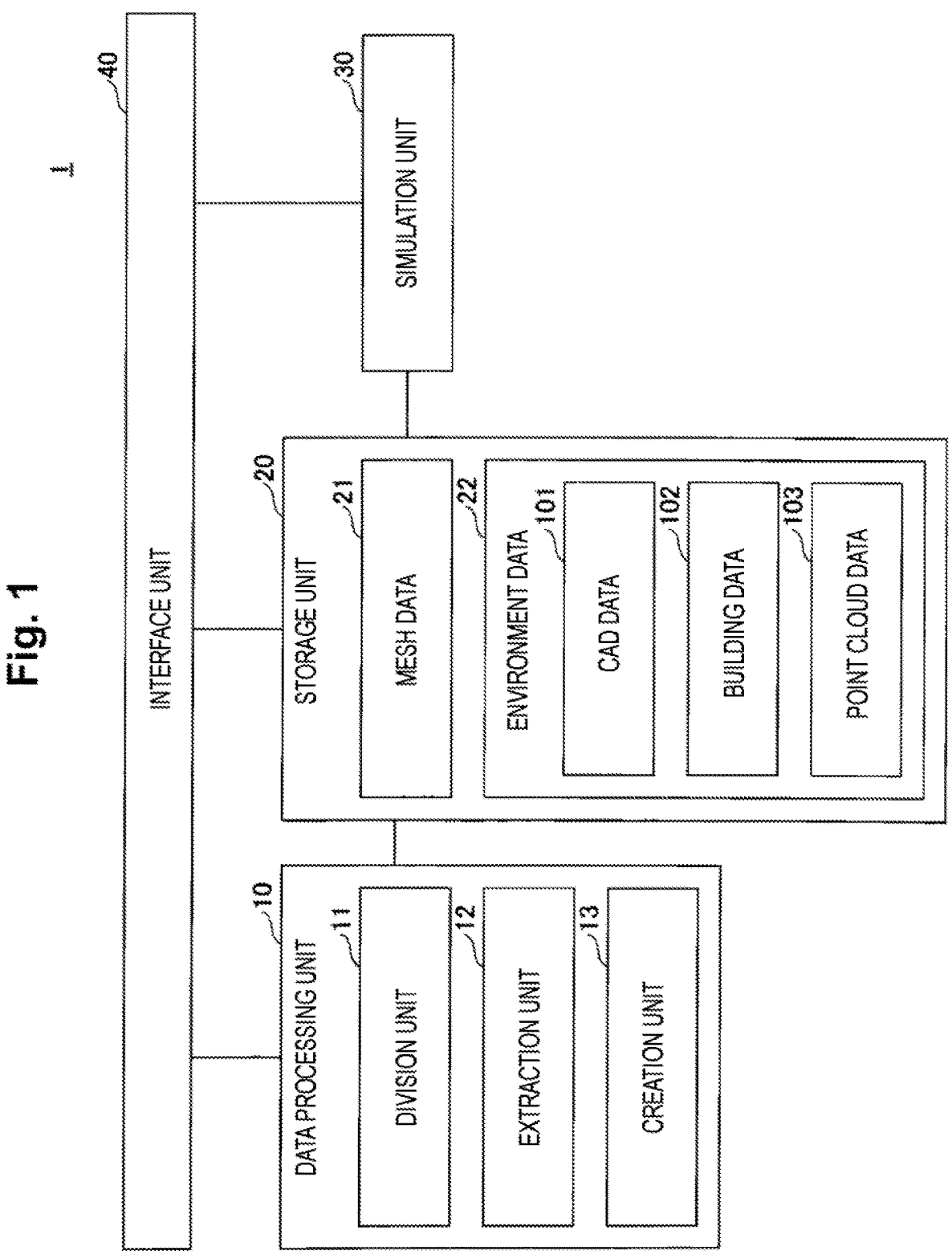
FIG. 1 is a diagram illustrating an example of a configuration of an information processing system according to the present embodiment.

FIG. 1 is a diagram illustrating an example of a configuration of an information processing system according to the present embodiment. In an information processing system 1, a computer included in the information processing system 1 executes a predetermined program, for example, to form a data processing unit 10, a storage unit 20, a simulation unit 30, an interface unit 40, and the like. Note that each of the functional components mentioned above is not necessarily formed with a program that is executed by a physical machine (a computer), but may be formed with a program that is executed by a virtual machine in a cloud. Alternatively, the respective functional components mentioned above may be scattered in separate physical machines or virtual machines.

The storage unit 20 stores in advance environment data 22 of the target area to be subjected to a radio wave propagation simulation. The environment data 22 may include computer aided design (CAD) data 101, building data 102, and point cloud data 103, for example.

The CAD data 101 is three-dimensional CAD data that includes data indicating the widths, the heights, the shapes, the positions, and the like of the respective surfaces of objects (structural objects, buildings, and the like) present in the target area, and information such as the reflectances of radio waves on the respective surfaces, for example. The CAD data 101 may be data that is input to a three-dimensional CAD system or the like by an operator or the like, or may be data that is generated on the basis of point cloud data acquired by light detection and ranging (LIDAR) or the like, for example.

The building data 102 is a database (a building database) that includes data indicating the widths, the heights, the shapes, the positions, and the like of the respective surfaces of the buildings present in the target area, and information such as the reflectances of radio waves on the respective surfaces. Preferably, the building data 102 includes information about the respective surfaces of walls, floors, ceilings, columns, and the like inside the building.

The point cloud data 103 is three-dimensional point cloud data that is acquired through LIDAR or the like, and indicates the distances or the like to the respective surfaces of the objects in the target area. Alternatively, the point cloud data 103 may be three-dimensional environment map data or the like that is created on the basis of three-dimensional point cloud information by a simultaneous localization and mapping (SLAM) technology.

Note that the storage unit 20 may be formed with a storage server outside the information processing system 1, a cloud service, or the like, for example.

The data processing unit 10 creates mesh data of a predetermined area for which the simulation unit 30 performs radio wave propagation simulations, using the environment data 22 such as the CAD data 101, the building data 102, or the point cloud data 103, for example. The data processing unit 10 includes a division unit 11, an extraction unit 12, and a creation unit 13, for example.

Figure 2A:
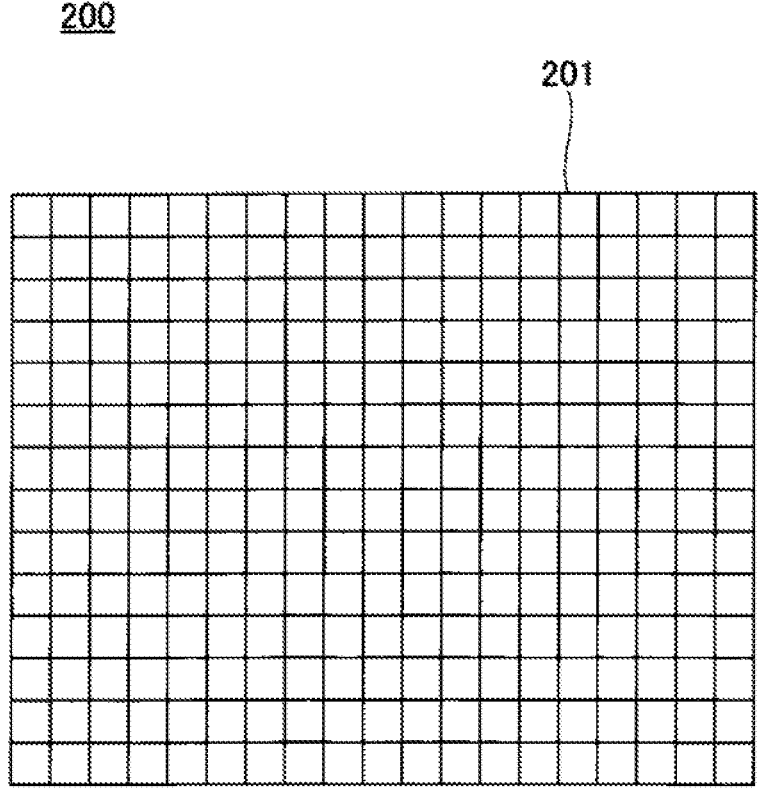
FIG. 2A is a diagram (1) for explaining an outline of data processing according to the present embodiment.

The division unit 11 divides the target area to be subjected to a radio wave propagation simulation, into meshes. For example, as illustrated in FIG. 2A, the division unit 11 divides a target area 200 into meshes 201 of a predetermined size. In an example, the division unit 11 divides the target area into meshes 201, on the basis of region meshes obtained by dividing an area into mesh zones in accordance with latitude and longitude.

FIG. 3 illustrates a region mesh division method disclosed on the homepage of Statistics Bureau of Japan (https://www.stat.go.jp/data/mesh/m_tuite.html). In an example, the division unit 11 divides the target area 200 into the meshes 201 in accordance with the region mesh division method illustrated in FIG. 3. Note that, by the region mesh division method illustrated in FIG. 3, only up to ¼ region meshes are defined, but the division unit 11 may extend the region mesh division method illustrated in FIG. 3 to ⅛ region meshes, 1/16 region meshes, . . . , or the like, for example, depending on a predetermined size.

In another example, the division unit 11 may divide the target area 200 into the meshes 201 on the basis of relative coordinates of the CAD data 101 or the like, in a case where latitude and longitude information is not required by the simulation unit 30 to perform an indoor radio wave propagation simulation.

Referring now back to FIG. 1, explanation of the functional components of the data processing unit 10 is continued. The extraction unit 12 extracts, from the environment data 22, height information about each of the meshes 201 as illustrated in FIG. 2A, for example. For example, the extraction unit 12 analyzes the CAD data 101, and, in a case where a structural object of three meters in height is present in a mesh 201, sets the height information about the mesh 201 to three meters. Note that, in a case where the height information about the mesh 201 cannot be obtained, the extraction unit 12 may analyze some other data in the environment data 22, such as the building data 102 or the point cloud data 103, and extract the height information about the subject mesh 201, for example. Further, in a case where the extraction unit 12 analyzes the environment data 22 and cannot obtain the height information about the mesh 201, the extraction unit 12 sets the height information about the subject mesh 201 to zero.

Figure 2B:
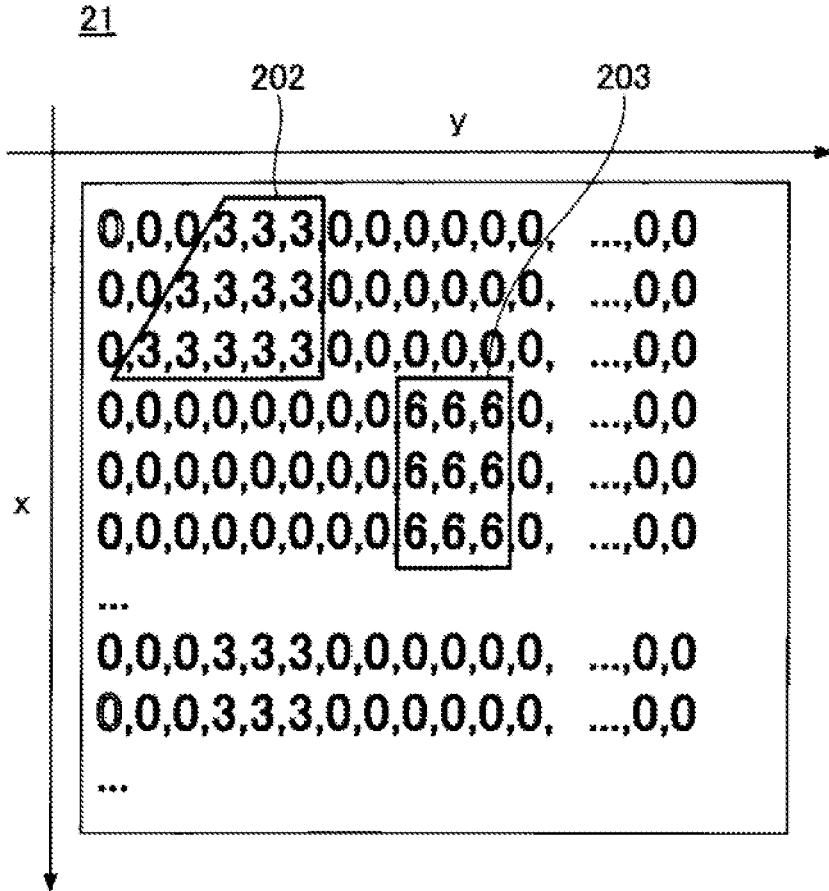
FIG. 2B is a diagram (2) for explaining an outline of data processing according to the present embodiment.

The creation unit 13 creates mesh data 21 as illustrated in FIG. 2B, for example, using the height information about each mesh 211 extracted by the extraction unit 12. In the mesh data 21 illustrated in FIG. 2B, the x and y directions correspond to the positions (such as the latitudes and the longitudes, or rows and columns, for example) of the respective meshes 201, and the value of the respective pieces of data indicate the height information about the respective meshes 201. Accordingly, the mesh data 21 indicates that a structural object of three meters in height is present in an area 202 that has height information of "3", and a structural object of six meters in height is present in an area 203 that has height information of "6", for example. It is also indicated that no structural objects are present in the area that has height information of "0", for example.

Thus, the data processing unit 10 can convert the data that is included in the environment data 22 stored in the storage unit 20 and indicates the widths, the heights, the shapes, the positions, and the like of the respective surfaces of the objects (such as structural objects and buildings) present in the target area, into two-dimensional mesh data 21 as illustrated in FIG. 2B. Further, this mesh data 21 has a format of image data, and thus has a characteristic of enabling high-speed reading and processing with use of a graphics processing unit (GPU).

The simulation unit 30 reads, from the storage unit 20 or the like, the mesh data 21 created by the data processing unit 10 and information such as the reflectances of the radio waves on the respective surfaces included in the environment data 22, and performs a radio wave propagation simulation with respect to the target area. Preferably, the simulation unit 30 uses a GPU included in the computer, to read the mesh data 21 having a format of image data at high speed.

For example, the simulation unit 30 performs a radio wave propagation simulation by ray tracing, using the read mesh data 21 and information such as the reflectances of the radio waves on the respective surfaces. In the ray tracing, how radio waves (rays) transmitted from the transmission point are reflected, diffracted, or transmitted by a structural object that is present on the way to the reception point, and reach the reception point is tracked (traced) as trajectories of the respective rays, and the powers of all the rays that have reached the reception point are added up, to estimate the intensity of the radio waves at the reception point. However, the radio wave propagation simulation to be performed by the simulation unit 30 may involve a method other than ray tracing.

Note that the mesh data 21 can be reused. Accordingly, in a case where the simulation unit 30 performs a radio wave propagation simulation with respect to the target area for the second time and later, the data processing unit 10 can skip the process of creating the mesh data 21.

As described above, according to the present embodiment, it is possible to provide an information processing system that shortens the time required for reading the environment data to be used in a radio wave propagation simulation.

The interface unit 40 provides an application programming interface (API) for another system to use the various functions provided by the information processing system 1, a user interface (UI) for a user to use the functions, and the like. For example, the user (or another system) can use the interface unit 40 to request the data processing unit 10 to create the mesh data 21, or to request for execution of a radio wave propagation simulation or the like. Also, the user (or another system) can use the interface unit 40 to set parameters (such as the position of the transmission point, the position of the reception point, the frequency, and the transmission power, for example) necessary for a radio wave propagation simulation, or to register the environment data 22 and the like in the storage unit 20.

<Process Flow>

Next, a process flow by a propagation environment data processing method according to the present embodiment is described.

Example 1

Figure 4:
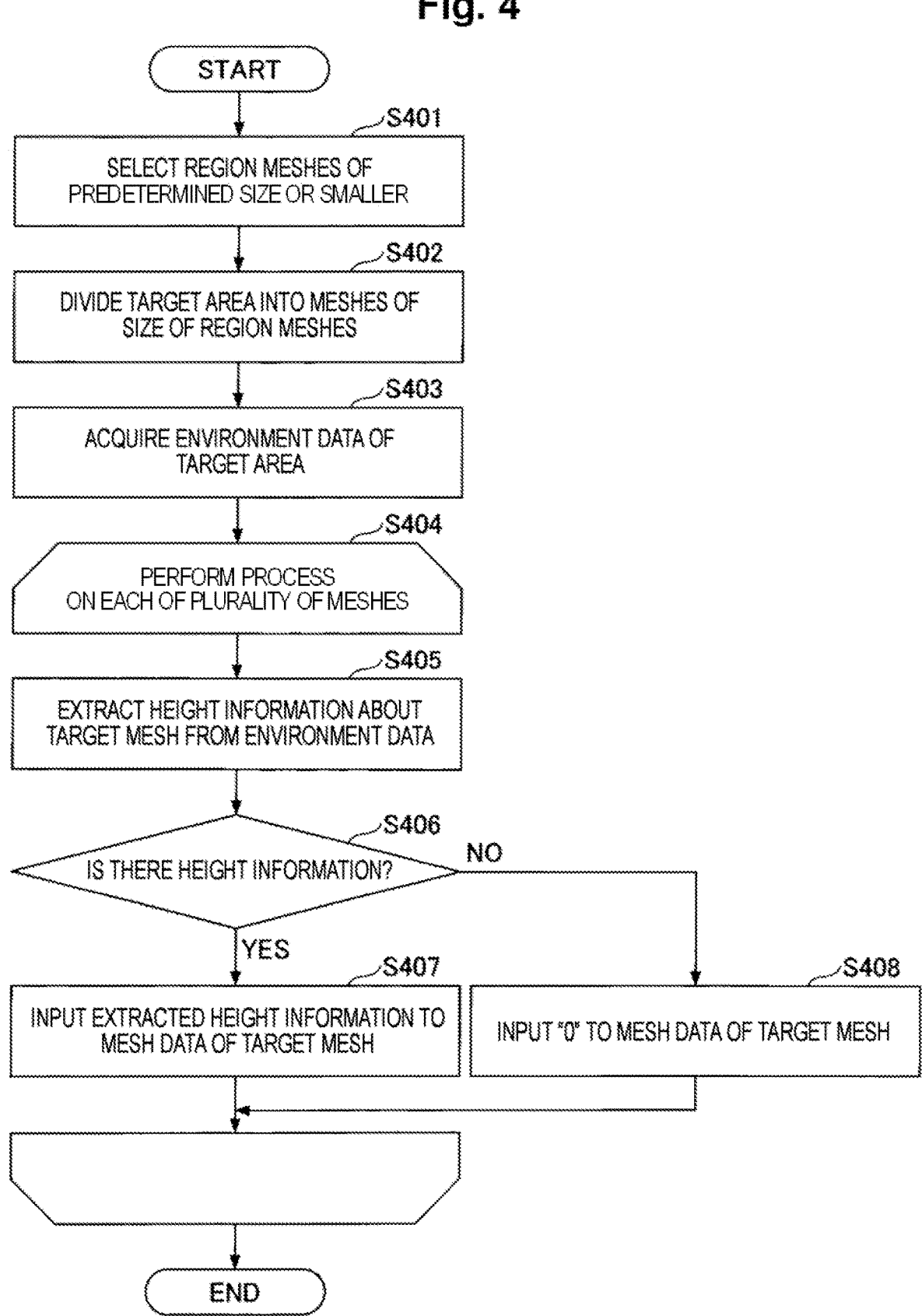
FIG. 4 is a flowchart illustrating an example of data processing according to Example 1.

FIG. 4 is a flowchart illustrating an example of data processing according to Example 1. This processing is an example of data processing in which the data processing unit 10 creates the mesh data 21, using the environment data 22.

In step S401, the division unit 11 of the data processing unit 10 selects region meshes of a predetermined size or smaller from among the region meshes shown in FIG. 3, for example, or extended region meshes (for example, ⅛ region meshes, 1/16 region meshes, and the like). Here, the predetermined size may be set by a user, another system, or the like via the simulation unit 30, for example, or may be set beforehand in the data processing unit 10.

In step S402, the division unit 11 divides the target area to be processed, into a plurality of meshes of the size of the region meshes. For example, as illustrated in FIG. 2A, the division unit 11 divides the target area 200 into a plurality of meshes 201 having the size of the region meshes selected in step S401.

In step S403, the extraction unit 12 of the data processing unit 10 acquires the environment data 22 of the target area from the storage unit 20, for example. Note that, in a case where the environment data 22 uses relative coordinates, instead of latitude and longitude, latitude and longitude information about any one point in the environment data 22 is preferably acquired beforehand, and is stored in the environment data 22, for example. In this manner, the data processing unit 10 can associate the relative coordinates of the environment data 22 with latitude and longitude.

In step S404, the data processing unit 10 performs the processes of steps S405 to S408 on each of the plurality of meshes 201.

In step S405, the extraction unit 12 of the data processing unit 10 extracts, from the environment data 22, the height information about the target mesh 201 of the plurality of meshes 201. Note that, in a case where there is a plurality of sets of environment data 22, such as the CAD data 101, the building data 102, and the point cloud data 103, the priority levels of the respective sets of data are preferably determined in advance. In this case, the extraction unit 12 may try to acquire the height information from data having a higher priority level, and extract the height information that can be acquired first.

In step S405, the creation unit 13 of the data processing unit 10 determines whether the environment data 22 includes the height information about the target mesh 201. For example, in a case where the extraction unit 12 has been able to acquire the height information from the environment data 22, the creation unit 13 determines that there is the height information. In a case where the extraction unit 12 has failed to acquire the height information from the environment data 22, on the other hand, the creation unit 13 determines that there is no height information. If there is the height information, the creation unit 13 proceeds to step S407. If there is no height information, on the other hand, the creation unit 13 proceeds to step S408.

When the process has proceeded to step S407, the creation unit 13 inputs the height information extracted by the extraction unit 12 to the mesh data of the target mesh 201. When the process has proceeded to step S408, on the other hand, the creation unit 13 inputs "0" to the mesh data of the target mesh 201.

The data processing unit 10 can create the mesh data 21 as illustrated in FIG. 2B, for example, by performing the processes of steps S405 to S408 on the respective meshes of the plurality of meshes 201.

Example 2

Example 1 described above is an example in which the data processing unit 10 divides the target area into region meshes as shown in FIG. 3, for example. However, the present embodiment is not limited to this example, and the data processing unit 10 may divide the target area into a plurality of meshes of a predetermined size, on the basis of relative coordinates with respect to the environment data 22 (such as the CAD data 101), for example.

For example, in a case where an indoor radio wave propagation simulation for a building or the like is performed, latitude and longitude information is not required in many cases. Furthermore, many indoor structural objects are disposed along wall surfaces or pillars of a building. Therefore, in some case, it may be better to divide the target area into areas of a predetermined size, on the basis of relative coordinates with respect to the environment data 22.

In view of this, Example 2 relates to an example of the processing to be performed in a case where the data processing unit 10 divides the target area into a plurality of meshes of a predetermined size, on the basis of the relative coordinates with respect to the environment data 22, for example.

Figure 5:
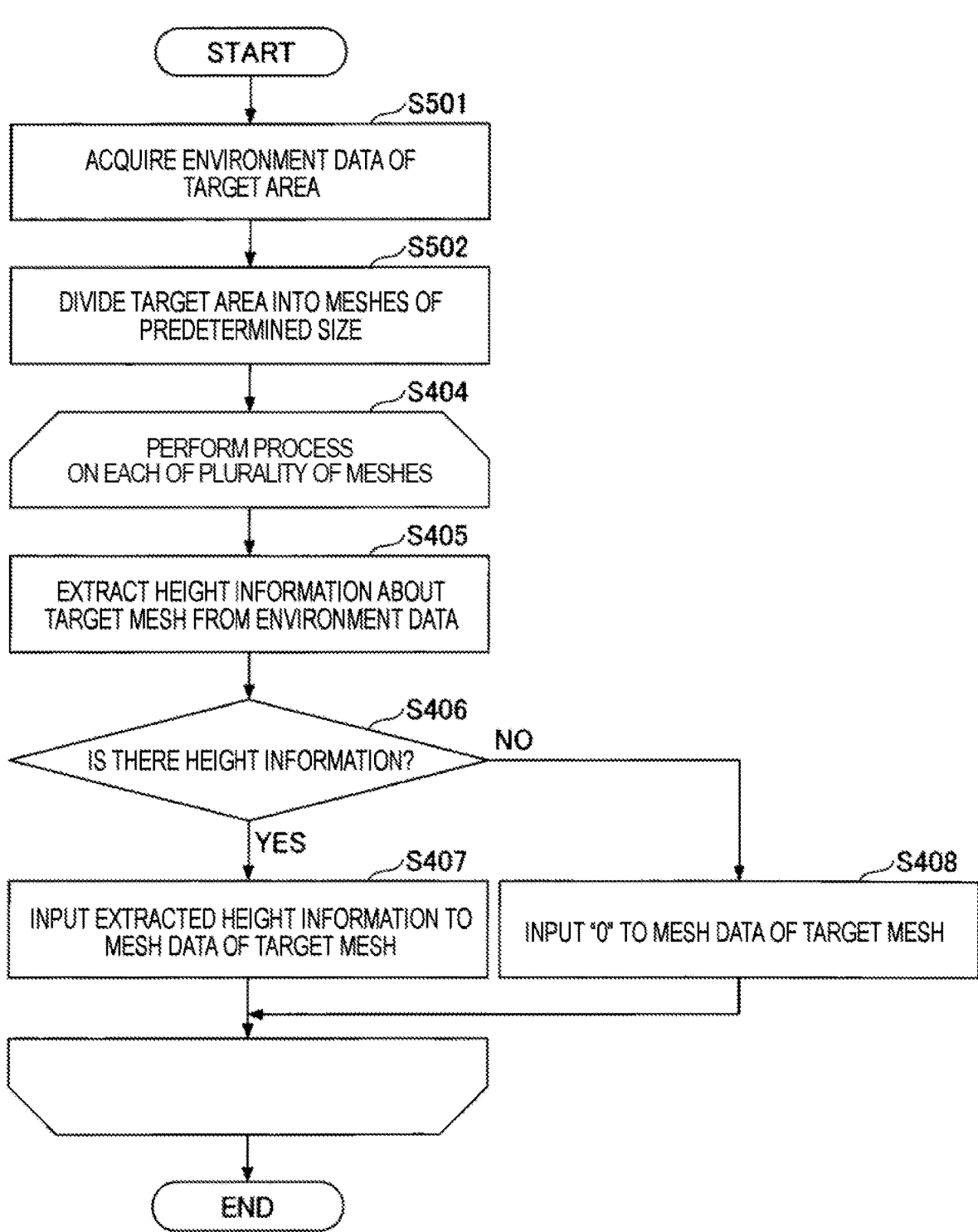
FIG. 5 is a flowchart illustrating an example of data processing according to Example 2.

FIG. 5 is a flowchart illustrating an example of data processing according to Example 2. This processing is another example of data processing in which the data processing unit 10 creates the mesh data 21, using the environment data 22. Note that, among the processes illustrated in FIG. 5, the processes of steps S404 to S408 are the same as the processes according to Example 1 described with reference to FIG. 4, and therefore, the differences from the processes according to Example 1 are mainly described herein.

In step S501, the division unit 11 of the data processing unit 10 acquires the environment data 22 of the target area from the storage unit 20, for example. For example, in a case where a radio wave propagation simulation is performed for a certain floor in a building, the division unit 11 acquires the environment data 22 of that floor.

In step S502, the division unit 11 divides the target area into meshes of a predetermined size. For example, on the basis of the relative coordinates with respect to the acquired environment data 22, the division unit 11 divides the target area 200 into a plurality of meshes 201 of a predetermined size as illustrated in FIG. 2A.

In step S404, the data processing unit 10 performs the processes of steps S405 to S408 on the respective meshes of the plurality of meshes 201, as in Example 1. In this manner, the data processing unit 10 can create the mesh data 21 as illustrated in FIG. 2B, for example.

However, in a case where an indoor radio wave propagation simulation is performed, ceiling data is required. In this case, the simulation unit 30 may acquire the mesh data 21 and the building data 102 from the storage unit 20, and acquire the ceiling data from the building data 102, for example. Also in this case, the building data 102 has a smaller amount of data than the CAD data 101, the point cloud data 103, or the like. Therefore, it is possible to expect the effect of shortening the time required for reading the environment data to be used in a radio wave propagation simulation.

In another example, in steps S404 to S408 of FIG. 5, the data processing unit 10 may create another set of mesh data indicating the ceiling heights with respect to the respective meshes in a similar format, in addition to the mesh data 21 as illustrated in FIG. 2B. In this case, the simulation unit 30 acquires the mesh data 21 and the other mesh data indicating the ceiling heights from the storage unit 20, and then performs a radio wave propagation simulation. In this case, the mesh data 21 and the other mesh data indicating the ceiling heights both have a format of image data, and thus, the simulation unit 30 can read the data at a high speed, using a GPU.

(Example of Hardware Configuration)

The information processing system 1 according to the present embodiment can be formed with a computer that is made to execute a program in which the processing contents described in the present embodiment are written.

The above program can be stored or distributed, being recorded in a computer-readable recording medium (a portable memory or the like). Further, the above program can also be provided through a network such as the Internet or electronic mail.

Figure 6:
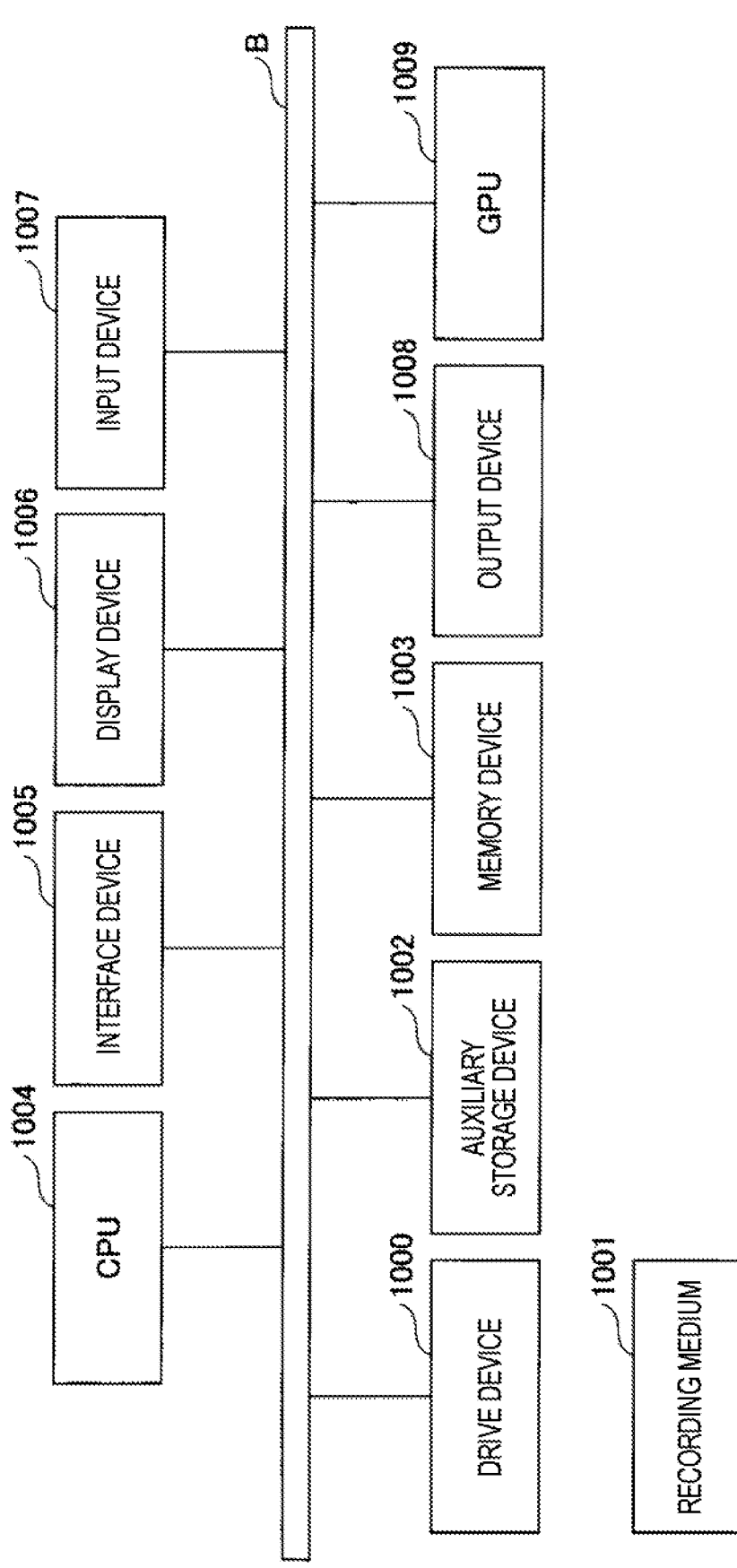
FIG. 6 is a diagram illustrating an example of a hardware configuration of a computer.

FIG. 6 is a diagram illustrating an example of hardware configuration of the computer mentioned above. A computer 600 in FIG. 6 includes a drive device 1000, an auxiliary storage device 1002, a memory device 1003, a CPU 1004, an interface device 1005, a display device 1006, an input device 1007, an output device 1008, and a GPU 1009 that are connected to one another by a bus B.

The program for performing processes in the computer 600 is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed from the recording medium 1001, but may be downloaded from another computer via a network. The auxiliary storage device 1002 stores the installed program, and also stores necessary files, data, and the like.

In a case where an instruction to start the program is given, the memory device 1003 reads the program from the auxiliary storage device 1002, and stores the program therein. In accordance with the program stored in the memory device 1003, the CPU 1004 implements the functions related to the respective components described in the present embodiment. The interface device 1005 is used as an interface for connecting to a network. The display device 1006 displays a GUI or the like according to the program. The input device 1007 is formed with a keyboard and a mouse, buttons, a touch panel, or the like, and is used to input various operation instructions. The output device 1008 outputs a calculation result. Note that the information processing system 1 need not include the display device 1006 and/or the input device 1007. The GPU 1009 is a processor that performs various processes mainly related to image processing (particularly, 3D graphics processing) at a higher speed than the CPU 1004.

Effects of the Embodiment

By the technology according to the present embodiment, it is possible to provide the information processing system 1 that shortens the time required for reading the environment data to be used in a radio wave propagation simulation.

SUMMARY OF THE EMBODIMENT

This specification discloses at least the information processing system, the propagation environment data processing method, and the program in accordance with the respective items listed below.

(Item 1)

An information processing system including:

a division unit configured to divide a target area into a plurality of meshes of a predetermined size;

an extraction unit configured to extract height information about the respective meshes of the plurality of meshes, using environment data indicating a position and a shape of an object present in the target area; and a creation unit configured to create mesh data indicating the height information about the respective meshes of the plurality of meshes.

(Item 2)

The information processing system of item 1, in which the mesh data has a GPU-readable data format.

(Item 3)

The information processing system of item 1 or 2, in which the division unit is configured to divide the target area into a plurality of region meshes that are based on latitude and longitude.

(Item 4)

The information processing system of item 1 or 2, in which the division unit is configured to divide the target area into a plurality of meshes of the predetermined size, on the basis of relative coordinates with respect to three-dimensional data included in the environment data.

(Item 5)

The information processing system of any one of items 1 to 4, in which the environment data includes three-dimensional CAD data indicating a position and a shape of a structural object present in the target area.

(Item 6)

The information processing system of any one of items 1 to 5, in which the environment data includes three-dimensional point cloud information indicating a position and a shape of a structural object present in the target area.

(Item 7)

The information processing system of any one of items 1 to 6, in which the environment data includes a building database indicating a position and a shape with respect to an outer side or an inner side of a building present in the target area.

(Item 8)

The information processing system of item 2, further including a simulation unit configured to read the mesh data with a GPU, and perform a radio wave propagation simulation.

(Item 9)

A propagation environment data processing method including:

dividing a target area into a plurality of meshes of a predetermined size;

extracting height information about the respective meshes of the plurality of meshes, using environment data indicating a position and a shape of an object present in the target area; and creating mesh data indicating the height information about the respective meshes of the plurality of meshes, wherein the dividing, the extracting, and the creating are implemented by an information processing system.

(Item 10)

A program for causing an information processing system to:

divide a target area into a plurality of meshes of a predetermined size;

extract height information about the respective meshes of the plurality of meshes, using environment data indicating a position and a shape of an object present in the target area; and create mesh data indicating the height information about the respective meshes of the plurality of meshes.

Although the present embodiment has been described above, the present invention is not limited to such a specific embodiment, and various modifications and changes can be made within the scope of the present invention described in the claims.

DESCRIPTION OF REFERENCE SIGNS 1 information processing system
11 division unit
12 extraction unit
13 creation unit
21 mesh data
22 environment data
30 simulation unit
101 CAD data
102 building data
103 point cloud data
1000 drive device
1001 recording medium
1002 auxiliary storage device
1003 memory device
1004 CPU
1005 interface device
1006 display device
1007 input device
1008 output device
1009 GPU

The invention claimed is:

1. An information processing system comprising a processor configured to:

divide a target area in a building into a plurality of meshes of a predetermined size;

extract height information about respective meshes of the plurality of meshes, using environment data indicating a position and a shape of an object present in the target area and an inside of the building;

create first mesh data indicating the height information about the respective meshes of the plurality of meshes, and second mesh data indicating ceiling heights of the respective meshes, the first and second mesh data having the same data format; and perform a radio wave propagation simulation inside the building using the first and second mesh data.

2. The information processing system according to claim 1, wherein the first mesh data and the second mesh data are in a GPU-readable data format.

3. The information processing system according to claim 1, wherein the processor is configured to divide the target area into a plurality of region meshes that are based on latitude and longitude.

4. The information processing system according to claim 1, wherein the processor is configured to divide the target area into a plurality of meshes of the predetermined size, on a basis of relative coordinates with respect to three-dimensional data included in the environment data.

5. The information processing system according to claim 1, wherein the environment data includes three-dimensional CAD data indicating a position and a shape of a structural object present in the target area.

6. The information processing system according to claim 1, wherein the environment data includes three-dimensional point cloud information indicating a position and a shape of a structural object present in the target area.

7. The information processing system according to claim 1, wherein the environment data includes a building database indicating a position and a shape of an outer side or an inner side with respect to a building present in the target area.

8. The information processing system according to claim 2, wherein the processor is configured to cause a GPU to read the first mesh data and the second mesh data, and perform a radio wave propagation simulation.

9. A propagation environment data processing method comprising:

dividing a target area in a building into a plurality of meshes of a predetermined size;

extracting height information about the respective meshes of the plurality of meshes, using environment data indicating a position and a shape of an object present in the target area and an inside of the building;

creating first mesh data indicating the height information about the respective meshes of the plurality of meshes, and second mesh data indicating ceiling heights of the respective meshes, the first and second mesh data having the same data format; and perform a radio wave propagation simulation inside the building using the first and second mesh data, wherein the dividing, the extracting, and the creating are implemented by an information processing system.

10. A computer-readable non-transitory recording medium storing a program for causing an information processing system to:

divide a target area in a building into a plurality of meshes of a predetermined size;

extract height information about the respective meshes of the plurality of meshes, using environment data indicating a position and a shape of an object present in the target area and an inside of the building;

create first mesh data indicating the height information about the respective meshes of the plurality of meshes, and second mesh data indicating ceiling heights of the respective meshes, the first and second mesh data having the same data format; and perform a radio wave propagation simulation inside the building using the first and second mesh data.

* * * * *